US012755514B2

(12) United States Patent
Cho et al.

(10) Patent No.: US 12,755,514 B2
(45) Date of Patent: Oct. 6, 2026

(54) APPARATUS AND METHOD FOR RE-IDENTIFYING OBJECT

(71) Applicants: Hyundai Motor Company, Seoul (KR); Kia Corporation, Seoul (KR); Industry-Academic Cooperation Foundation, Yonsei University, Seoul (KR)

(72) Inventors: Kyung Hwan Cho, Anyang-si (KR); Moon Sub Jin, Yongin-si (KR); Hyeon Seok Jung, Suwon-si (KR); Bum Sub Ham, Seoul (KR); Chan Ho Eom, Seoul (KR); Geon Lee, Seoul (KR)

(73) Assignees: Hyundai Motor Company, Seoul (KR); Kia Corporation, Seoul (KR); Industry-Academic Cooperation Foundation, Yonsei University, Seoul (KR)

( * ) Notice: Subject to any disclaimer, the term of this patent is extended or adjusted under 35 U.S.C. 154(b) by 326 days.

(21) Appl. No.: 17/977,720

(22) Filed: Oct. 31, 2022

(65) Prior Publication Data

US 2024/0005638 A1 Jan. 4, 2024

(30) Foreign Application Priority Data

May 25, 2022 (KR) ........................ 10-2022-0064204

(51) Int. Cl.
*G06V 10/77* (2022.01)
*G06F 18/22* (2023.01)
(Continued)

(52) U.S. Cl.
CPC .......... *G06V 10/7715* (2022.01); *G06F 18/22* (2023.01); *G06N 3/08* (2013.01);
(Continued)

(58) Field of Classification Search
CPC ............. G06V 10/7715; G06V 10/761; G06V 10/764; G06V 10/36; G06V 10/82;
(Continued)

(56) References Cited

U.S. PATENT DOCUMENTS 3,853,403 A * 12/1974 Bentley .............. G06K 7/10831 250/568
6,192,371 B1 2/2001 Schultz
(Continued)

FOREIGN PATENT DOCUMENTS

CN 106557756 A 4/2017
CN 108921107 A * 11/2018 ......... G06K 9/00369
(Continued)

OTHER PUBLICATIONS

Liu et al., Deep Relative Distance Learning: Tell the Difference between Similar Vehicles, Dec. 12, 2016 (on-line) [retrieved Dec. 8, 2024], 2016 IEEE Conference on Computer Vision and Pattern Recognition (CVPR): Jun. 27-30, 2016, pp. 2167-2175. DOI: 10.1109/CVPR.2016.238 (Year: 2016).*
(Continued)

*Primary Examiner* — Henok Shiferaw
*Assistant Examiner* — Dennis Rosario
(74) *Attorney, Agent, or Firm* — Slater Matsil, LLP

(57) ABSTRACT

An apparatus and a method for re-identifying an object to improve object re-identification performance using attribute information of the object are provided. The apparatus trains an object representation extraction model to train attribute representations, inputs an image obtained by a camera to the trained object representation extraction model, extracts object representations from the image using the trained object representation extraction model, and performs object re-identification based on the object representations.

16 Claims, 8 Drawing Sheets

(51) Int. Cl.

| | |
|---|---|
| ***G06N 3/08*** | (2023.01) |
| ***G06N 3/09*** | (2023.01) |
| ***G06V 10/74*** | (2022.01) |
| ***G06V 10/764*** | (2022.01) |
| ***G06V 40/16*** | (2022.01) |

(52) U.S. Cl.

CPC ............... *G06N 3/09* (2023.01); *G06V 10/74* (2022.01); *G06V 10/761* (2022.01); *G06V 10/764* (2022.01); *G06V 40/173* (2022.01)

(58) Field of Classification Search

CPC ............. G06V 40/103; G06V 10/7557; G06V 10/774; G06V 10/52; G06V 20/698; G06V 20/58; G06V 10/762; G06V 10/765; G06V 10/809; G06V 20/52; G06V 20/597; G06V 20/588; G06V 2201/06; G06V 40/28; G06V 40/16; G06V 10/70; G06V 10/74; G06V 30/19093; G06V 30/19087; G06V 10/75; G06V 20/48; G06V 10/751; G06V 40/173; G06V 30/19007; G06N 20/00; G06N 5/04; G06N 3/02; G06N 3/08; G06N 3/09; G06F 18/24; G06F 16/35; G06F 2218/12; G06F 18/2431; G06F 18/23; G06F 18/241; G06F 40/295; G06F 30/27; G06F 16/906; G06F 18/00; G06F 18/243; G06F 18/24765; G06F 18/254; G06F 18/22; G06T 2207/20081; G06T 2207/20084

See application file for complete search history.

(56) References Cited

U.S. PATENT DOCUMENTS

| | | | | |
|---|---|---|---|---|
| 6,775,395 | B2 | 8/2004 | Nishigaki et al. | |
| 6,871,196 | B1 | 3/2005 | Chan et al. | |
| 7,447,701 | B2 | 11/2008 | Agarwal et al. | |
| 9,396,412 | B2 | 7/2016 | Kuo et al. | |
| 9,449,258 | B1 | 9/2016 | Palacio et al. | |
| 9,852,340 | B2 | 12/2017 | Mai et al. | |
| 9,858,679 | B2 | 1/2018 | Zhang | |
| 9,953,245 | B2 | 4/2018 | Palacio et al. | |
| 10,043,103 | B2 | 8/2018 | Dodballapur et al. | |
| 10,248,860 | B2 | 4/2019 | Mai et al. | |
| 10,282,616 | B2 | 5/2019 | Gong et al. | |
| 10,607,484 | B2 | 3/2020 | Yang et al. | |
| 10,915,662 | B2 | 2/2021 | Gkoulalas-Divanis | |
| 11,017,261 | B1 | 5/2021 | Zheng et al. | |
| 11,138,418 | B2 | 10/2021 | Zuckerman et al. | |
| 11,301,687 | B2 | 4/2022 | Chen et al. | |
| 11,321,556 | B2 | 5/2022 | Ham et al. | |
| 11,386,306 | B1 | 7/2022 | Siddiquie et al. | |
| 11,417,082 | B2 | 8/2022 | Zheng et al. | |
| 11,462,036 | B2 | 10/2022 | Smith et al. | |
| 11,488,410 | B2 | 11/2022 | Ding et al. | |
| 11,910,784 | B2 | 2/2024 | Shmigelsky et al. | |
| 12,165,327 | B2 | 12/2024 | Qi et al. | |
| 12,260,330 | B2 | 3/2025 | Sawada et al. | |
| 12,381,915 | B2 | 8/2025 | Barday et al. | |
| 2009/0034791 | A1 | 2/2009 | Doretto et al. | |
| 2018/0307899 | A1 | 10/2018 | Das et al. | |
| 2019/0034716 | A1 | 1/2019 | Kamarol et al. | |
| 2019/0205620 | A1* | 7/2019 | Yi | G06V 40/172 |
| 2021/0064853 | A1 | 3/2021 | Ham et al. | |
| 2021/0264153 | A1 | 8/2021 | Viss et al. | |
| 2022/0165048 | A1 | 5/2022 | Ham et al. | |
| 2023/0034136 | A1* | 2/2023 | Chow | G06N 20/00 |
| 2023/0298347 | A1 | 9/2023 | Tarashima | |
| 2024/0005638 | A1 | 1/2024 | Cho et al. | |
| 2024/0221346 | A1* | 7/2024 | Wang | G06V 10/44 |
| 2024/0264275 | A1 | 8/2024 | Han et al. | |

FOREIGN PATENT DOCUMENTS

| | | | | | |
|---|---|---|---|---|---|
| CN | 111061890 | A | * | 4/2020 | G06F 18/214 |
| CN | 111476222 | A | * | 7/2020 | G06F 18/24 |
| CN | 112652058 | A | * | 4/2021 | G06N 3/045 |
| EP | 3961485 | A1 | | 3/2022 | |
| JP | 2021039740 | A | | 3/2021 | |
| KR | 101941994 | B1 | | 1/2019 | |
| KR | 20190068000 | A | | 6/2019 | |
| KR | 20200015610 | A | | 2/2020 | |
| KR | 20200023221 | A | | 3/2020 | |
| KR | 102127946 | B1 | | 6/2020 | |
| KR | 102187302 | B1 | | 12/2020 | |
| KR | 102225022 | B1 | | 3/2021 | |
| KR | 102225613 | B1 | | 3/2021 | |
| KR | 20220012733 | A | | 2/2022 | |
| KR | 20220014461 | A | * | 2/2022 | G06F 18/24 |
| KR | 20220064204 | A | | 5/2022 | |
| KR | 20230164447 | A | | 12/2023 | |

OTHER PUBLICATIONS

Liu et al., PROVID: Progressive and Multimodal Vehicle Reidentification for Large-Scale Urban Surveillance, Sep. 13, 2017 (very first instance of public dissemination) [retrieved Dec. 8, 2024], IEEE Transactions on Multimedia , vol. 20, Issue: 3, Mar. 2018, pp. 645-658. DOI: 10.1109/TMM.2017.2751966 (Year: 2017).*

Eom et al., Disentangled Representations for Short-Term and Long-Term Person Re-Identification, Oct. 26, 2021 (very first instance of public dissemination) [retrieved Dec. 8, 2024], IEEE Transactions on Pattern Analysis and Machine Intelligence, vol. 44, Issue: 12, Dec. 1, 2022, pp. 8975-8991. DOI: 10.1109/TPAMI.2021.3122444 (Year: 2021).*

Wang et al., Learning Sparse and Identity-Preserved Hidden Attributes for Person Re-Identification, Oct. 17, 2019 [retrieved Mar. 27, 2025], IEEE Transactions on Image Processing, vol. 29, pp. 2013-2025. DOI: 10.1109/TIP.2019.2946975 (Year: 2019).*

Mirjalili, Semi-Adversarial Networks for Imparting Demographic Privacy to Face Images [dissertation], 2020 [retrieved Mar. 27, 2025], ProQuest, 207 pages. https://www.proquest.com/dissertations-theses/semi-adversarial-networks-imparting-demographic/docview/2477876609/se-2 (Year: 2020).*

Wang et al., Inter-Domain Adaptation Label for Data Augmentation in Vehicle Re-Identification, Aug. 13, 2021 [retrieved Mar. 27, 2025], IEEE Transactions on Multimedia, vol. 24, pp. 1031-1041. DOI: 10.1109/TMM.2021.3104141 (Year: 2021).*

Xu et al., Attribute Prototype Network for Zero-Shot Learning, May 6, 2021 [retrieved Mar. 27, 2025], Cornell University: arXiv, version [v4], 12 pages. https://doi.org/10.48550/arXiv.2008.08290 (Year: 2021).*

Search machine translation of CN-108921107-A to Qi et al., Then Identifying Method Based on Pedestrian Ranking Loss and Siamese Network, translated May 21, 2025, 8 pages. (Year: 2025).*

Search machine translation of CN 112652058 A to Zheng et al., Human Face Image Redisplaying Method, Device, Computer Device and Storage Medium, translated May 21, 2025, 18 pages. (Year: 2025).*

Google Patents machine translation of CN108921107A to inventor 祁子梁, Human Face Image Redisplaying Method, Device, Computer Device and Storage Medium, translated May 21, 2025, 8 pages. (Year: 2025).*

Machine translation of CN 111061890-A to Zhuo, A Method and Device for Method for Labelling Information Verification, The Category Determination, translated Oct. 21, 2025, 35 pages. (Year: 2025).*

Machine translation of CN 111476222-A to Xu, Image Processing Method, Device, Computer Device and Computer Readable Storage Medium, translated Oct. 21, 2025, 24 pages. (Year: 2025).*

Gronberg, Plankton Recognition From Imaging Flow Cytometer Data Using Convolutional Neural Networks (thesis), 2018 [retrieved Feb. 15, 2026], Lappeenranta-Lahti University of Technology, 74 pages. https://um.fi/URN:NBN:fi-fe2019052717240 (Year: 2018).*

(56) References Cited

OTHER PUBLICATIONS

Zou, Weakly Supervised Visual Understanding (dissertation), Sep. 2020 [retrieved Feb. 15, 2026], Carnegie Mellon University, 170 pages. Retrieved: https://www.proquest.com/openview/b3f859620a6bbcd1e65fa1156dc75ed9/1?pq-origsite=gscholar&cbl=18750&diss=y (Year: 2020).*
Search machine translation of KR-20220014461-A to Kim, Generalized Zero-Shot Object Recognition Device and Generalized Zero-Shot Object Recognizing Method, translated Feb. 13, 2026, 12 pages. (Year: 2026).*
Search machine translation of CN-112652058-A to Zheng, Human Face Image Redisplaying Method, Device, Computer Device and Storage Medium, translated Jul. 7, 2026, 33 pages. (Year: 2026).*
"Data Type—Find AI Data—AI-Hub," https://aihub.or.kr/aihubdata/data/view.do?currMenu=116&topMenu=100&aihubDataSe=ty&dataSetSn=84, Apr. 3, 2023, 8 pages.
Jiang et al., "AttKGCN: Attribute Knowledge Graph Convolutional Network for Person Re-identification," https://doi.org/10.48550/arXiv.1911.10544, Nov. 24, 2019, 8 pages.
Lin et al., "Improving Person Re-identification by Attribute and Identity Learning," https://doi.org/10.48550/arXiv.1703.07220, Jun. 9, 2019, 12 pages.
Liu et al., "CA3Net: Contextual-Attentional Attribute-Appearance Network for Person Re-Identification," https://doi.org/10.48550/arXiv.1811.07544, Nov. 19, 2018, 9 pages.
J. Wang et al., "Attribute Recognition by Joint Recurrent Learning of Context and Correlation" IEEE, Sep. 25, 2017, 10 pages.
T. Matsukawa et al., "Person Re-Identification Using CNN Features Learned from Combination of Attributes," 23rd International Conf. on Pattern Recognition (ICPR), Dec. 4-8, 2016, 6 pages.

* cited by examiner

APPARATUS AND METHOD FOR RE-IDENTIFYING OBJECT

CROSS-REFERENCE TO RELATED APPLICATIONS

This application claims the benefit of Korean Patent Application No. 10-2022-0064204, filed on May 25, 2022, which application is hereby incorporated herein by reference.

TECHNICAL FIELD

The present disclosure relates to an apparatus and a method for re-identifying an object to improve object re-identification performance using attribute information of the object.

BACKGROUND

A person re-identification technology is to search for the same person from images captured in different conditions. It is difficult to implement this technology, because the same person may look different depending on camera angle, posture, and lighting conditions, and because other persons may look similar to each other when they take a similar posture or wear similar clothes.

Thus, an existing technology proposes a method for performing training (learning) and inference using both of a person representation extraction module and an attribute representation extraction module to re-identify the same person based on a person attribute. However, such an existing technology respectively make up modules for performing person representation extraction and attribute representation extraction on one network. As the person representation extraction module and the attribute representation extraction module separately operate, because output results are not fused, performance degradation occurs due to trade-off between tasks in the training process.

Furthermore, as person representations include attribute information of the person, because there is information duplicated in the person representations and the attribute representations, the existing technology occupies many memory spaces and may degrade an inference speed.

SUMMARY

The present disclosure has been made to solve the above-mentioned problems occurring in the prior art while advantages achieved by the prior art are maintained intact.

Embodiments provide an apparatus and a method for re-identifying an object to process object re-identification, object attribute prediction (or object attribute recognition), and attribute-based object search using a single model.

The technical problems to be solved by the embodiments are not limited to the aforementioned problems, and any other technical problems not mentioned herein will be clearly understood from the following description by those skilled in the art to which the embodiments pertain.

Embodiments include an apparatus for re-identifying an object may include a processor. The processor may train object representation extraction model to train attribute representations, may input an image obtained by a camera to the trained object representation extraction model, may extract object representations from the image using the trained object representation extraction model, and may perform object re-identification based on the object representations.

The processor may train a relationship between the object representations and the attribute representations in the object representation extraction model using a loss function.

The processor may limit a similarity between the object representations and the attribute representations not to be increased, when the similarity between the object representations and the attribute representations is greater than a predetermined threshold.

The processor may extract a full feature and a partial feature for an object in the image.

The processor may extract first object representations from a first image using the trained object representation extraction model and may extract second object representations from a second image using the trained object representation extraction model.

The processor may determine a similarity between the first object representations and the second object representations, may determine that a first object in the first image and a second object in the second image are the same object, when the determined similarity is greater than a predetermined threshold, and may determine that the first object and the second object are different objects, when the determined similarity is less than or equal to the predetermined threshold.

The processor may finally determine a similarity between the first object representations and the second object representations by applying a weight.

The processor may classify and group pieces of attribute information of a predefined object depending on a predetermined classification condition, may generate a semantic identity (ID) by means of a combination of the pieces of attribute information in the grouped group, and may return attribute representations corresponding to the semantic ID.

The processor may calculate a similarity between the returned attribute representations and the object representations and may classify an object attribute based on the similarity between the returned attribute representations and the object representations.

The object representations may have the same size as the attribute representations.

Embodiments include a method for re-identifying an object may include training, by a processor, an object representation extraction model to train an attribute representation, inputting, by the processor, an image obtained by a camera to the trained object representation extraction model, extracting, by the processor, object representations from the image using the trained object representation extraction model, and performing, by the processor, object re-identification based on the object representations.

The training of the object representation extraction model may include training, by the processor, a relationship between the object representations and the attribute representations in the object representation extraction model using a loss function.

The training of the object representation extraction model may further include limiting, by the processor, a similarity between the object representations and the attribute representations not to be increased, when the similarity between the object representations and the attribute representations is greater than a predetermined threshold.

The extracting of the object representations may include extracting, by the processor, a full feature and a partial feature for an object in the image.

The extracting of the object representations may include extracting, by the processor, first object representations from a first image using the trained object representation extraction model and extracting, by the processor, second object representations from a second image using the trained object representation extraction model.

The extracting of the object representations may include determining, by the processor, a similarity between the first object representations and the second object representations, determining, by the processor, that a first object in the first image and a second object in the second image are the same object, when the determined similarity is greater than a predetermined threshold, and determining, by the processor, that the first object and the second object are different objects, when the determined similarity is less than or equal to the predetermined threshold.

The determining of the similarity between the first object representations and the second object representations may include finally determining, by the processor, a similarity between the first object representations and the second object representations by applying a weight.

The training of the object representation extraction model may include classifying and grouping, by the processor, pieces of attribute information of a predefined object depending on a predetermined classification condition, generating, by the processor, a semantic ID by means of a combination of the pieces of attribute information in the grouped group, and returning, by the processor, an attribute representation corresponding to the semantic ID.

The method may further include calculating, by the processor, a similarity between the returned attribute representations and the object representations and classifying, by the processor, an object attribute based on the similarity between the returned attribute representations and the object representations.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF ILLUSTRATIVE EMBODIMENTS

Figure 1:
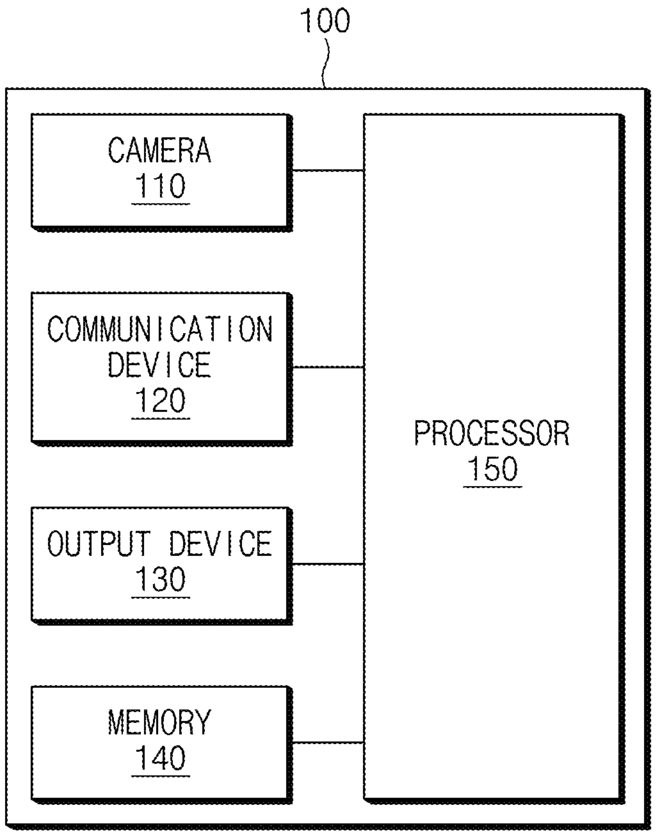
FIG. 1 is a block diagram illustrating a configuration of an apparatus for re-identifying an object according to embodiments of the present disclosure.

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

In describing the components of the embodiment according to the present disclosure, terms such as first, second, “A”, “B”, (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Embodiments of the present disclosure may propose a unified framework capable of re-identifying an object from an input image including the object such as a person or a vehicle, predicting an appearance feature of the object, and may simultaneously perform three tasks for searching for an object based on the appearance feature.

FIG. 1 is a block diagram illustrating a configuration of an apparatus for re-identifying an object according to embodiments of the present disclosure.

Referring to FIG. 1, the apparatus 100 for re-identifying the object may include a camera 110, a communication device 120, an output device 130, a memory 140, and a processor 150.

The camera no may obtain an image including an object in real time or at intervals of a predetermined time. Herein, the object may be a person (e.g., a pedestrian or the like), a vehicle, or the like. The camera no may include at least one of image sensors such as a charge coupled device (CCD) image sensor, a complementary metal oxide semi-conductor (CMOS) image sensor, a charge priming device (CPD) image sensor, or a charge injection device (CID) image sensor. Furthermore, the camera no may include at least one of lenses such as a standard lens, an ultra-wide lens, a wide lens, a zoom lens, a close-up lens, or a telephoto lens. The camera no may include an image processor capable of processing (or performing) noise cancellation, color reproduction, file compression, image quality adjustment, and saturation adjustment for an image obtained by the image sensor.

The communication device 120 may assist in performing wired or wireless communication between the apparatus 100 for re-identifying the object and an external electronic device (e.g., a closed circuit television (CCTV), a smartphone, a security system, or the like). The communication device 120 may communicate with the external electronic device using a wired communication technology, such as a local area network (LAN), a wide area network (WAN), an Ethernet, and/or an integrated services digital network (ISDN), and/or a wireless communication technology, such as a wireless LAN (WLAN) (Wi-Fi), wireless broadband (Wibro), Bluetooth, near field communication (NFC), radio frequency identification (RFID), infrared data association (IrDA), long term evolution (LTE), LTE-advanced (LTE-A), and international mobile telecommunication (IMT)-2020. The communication device 120 may include a communication processor, a communication circuit, an antenna, a transceiver, and/or the like.

The output device 130 may output visual information, audible information, and/or the like, which may include a display, a speaker, and/or the like. The display may be implemented as a liquid crystal display (LCD), a thin film transistor-liquid crystal display (TFT-LCD), an organic light-emitting diode (OLED) display, a flexible display, a three-dimensional (3D) display, a transparent display, a head-up display (HUD), a touch screen, or the like. When the output device 130 is implemented as the touch screen, it may also be used as an input device.

The memory 140 may store a single model (or an attribute-based object representation extraction model) for processing object re-identification, object attribute prediction, and attribute-based object search. The memory 140 may store at least one attribute representations, an attribute similarity-based training loss function, and/or the like. The memory 140 may be a non-transitory storage medium which stores instructions executed by the processor 150. The memory 140 may include at least one of storage media, such as a flash memory, a hard disk, a solid state disk (SSD), a secure digital (SD) card, a random access memory (RAM), a static RAM (SRAM), a read only memory (ROM), a programmable ROM (PROM), an electrically erasable and programmable ROM (EEPROM), or an erasable and programmable ROM (EPROM).

The processor 150 may control the overall operation of the apparatus 100 for re-identifying the object. The processor 150 may be implemented as at least one of processing devices such as an application specific integrated circuit (ASIC), a digital signal processor (DSP), a programmable logic device (PLD), a field programmable gate array (FPGA), a central processing unit (CPU), a microcontroller, or a microprocessor.

The processor 150 may process object re-identification, object attribute prediction, and attribute-based object search in the single model, that is, an integrated framework. The processor 150 may separate object representations using attribute information.

The processor 150 may obtain at least one image using the camera 110 or the communication device 120. The processor 150 may receive an image captured by the camera 110 from the camera 110. Furthermore, the processor 150 may receive an image obtained by the external electronic device through the communication device 120. Furthermore, the processor 150 may access an image stored in the memory 140. Herein, the image may be an object image including an object such as a person or a vehicle.

The processor 150 may extract object representations from an input image (or an object image, a person image, or the like). The object representations may include multiple partial object representations indicating particular traits (e.g., a gender, a clothing style, or the like) of the object. For example, when the object is a person, the multiple partial object representations may be divided into five groups and may be represented as Table 1 below.

TABLE 1

| Classification | Meaning |
|---|---|
| I (Identity) | Represent global features of person |
| C (Carrying) | Represent features of goods carried by person |
| H (Head) | Represent head features of person |
| U (Upper body) | Represent upper body features of person |
| L (Lower body) | Represent lower body features of person |

The processor 150 may train (or learn) object representations using at least one object attribute representation (hereinafter referred to as an "attribute representations") and a training loss function, which are stored in the memory 140. Because of fusing the object representations with the attribute representations in such a training process, the processor 150 may extract attribute-based object representations in an inference process. The processor 150 may divide and group pieces of attribute information of a predefined object (e.g., a person) depending on a predetermined classification condition. For example, the attribute group may be grouped by attributes having a similar characteristic and may be defined as Table 2 below. The processor 150 may generate a semantic identity (SID) by means of a combination of the pieces of attribute information in the group. The processor 150 may return attribute representations corresponding to the generated SID. The returned attribute representations may be used to measure a similarity with the object representations to be trained to be similar to an attribute prototype corresponding to the object representations. In other words, the processor 150 may train a prototype for each SID.

TABLE 2

| Group | Attribute |
|---|---|
| Identity I | Gender, Age |
| Carrying C | Backpack, Bag, Handbag |
| Head H | Hat, Head length |
| Upper body U | Color of top, Sleeve length |
| Lower body L | Color of bottoms, Length of bottoms, Style of bottoms |

The training loss function may be represented as Equation 1 below.

$$\text{Loss}_I = -\log\left(p\left(y_i|f_i^I\right)\right) + \max\left((1-m_I) - \cos sim\left(f_i^I,\ p_{s_i}^I\right), 0\right) \quad \text{[Equation 1]}$$

Herein, $y_i$ denotes the object ID label of the ith image, $$f_i^I$$

denotes the object representations of the ith image, $$p\left(y_i|f_i^I\right)$$

denotes the probability of accurately predicting the object ID label of the ith image by means of the object representations of the ith image, $$p_{s_i}^I$$

denotes the attribute representations for group I of the ith image, and $m_G$ denotes the boundary margin value for group I. $m_I$ may be defined in advance by a system designer. In Equation 1 above, $$\max\left((1-m_I)-\cos sim\left(f_i^I,\ p_{s_i}^I\right),\ 0\right)$$

increases a cosine similarity (cos sim) between the object representations of the ith image and the corresponding attribute representations. However, when the similarity between the object representations and the corresponding attribute representations is more increased than a (1−$m_I$) value, the loss function is made "0" by means of a max function, thus not increasing the similarity therebetween any longer. In other words, all of representations of objects having the same attribute are not made the same as each other, which may be trained to be only similar in a certain degree (e.g., 90%).

The processor 150 may calculate (or compute) a similarity between object representations extracted from different images. The processor 150 may compute (or measure) a similarity between object representations using a similarity measurement method such as the cosine similarity. The processor 150 may compute a similarity between partial object representations and may apply a weight to the computed similarity to calculate (or determine) a final similarity.

When the finally determined similarity is greater than a predetermined threshold, the processor 150 may determine objects in different images as the same object. When the computed similarity is less than or equal to the predetermined threshold, the processor 150 may determine the objects in the different images as different objects.

Furthermore, the processor 150 may compute a similarity between the extracted object representations and the attribute representations stored in the memory 140. The processor 150 may classify object attributes based on the similarity between the extracted object representations and the attribute representations.

Figure 2:
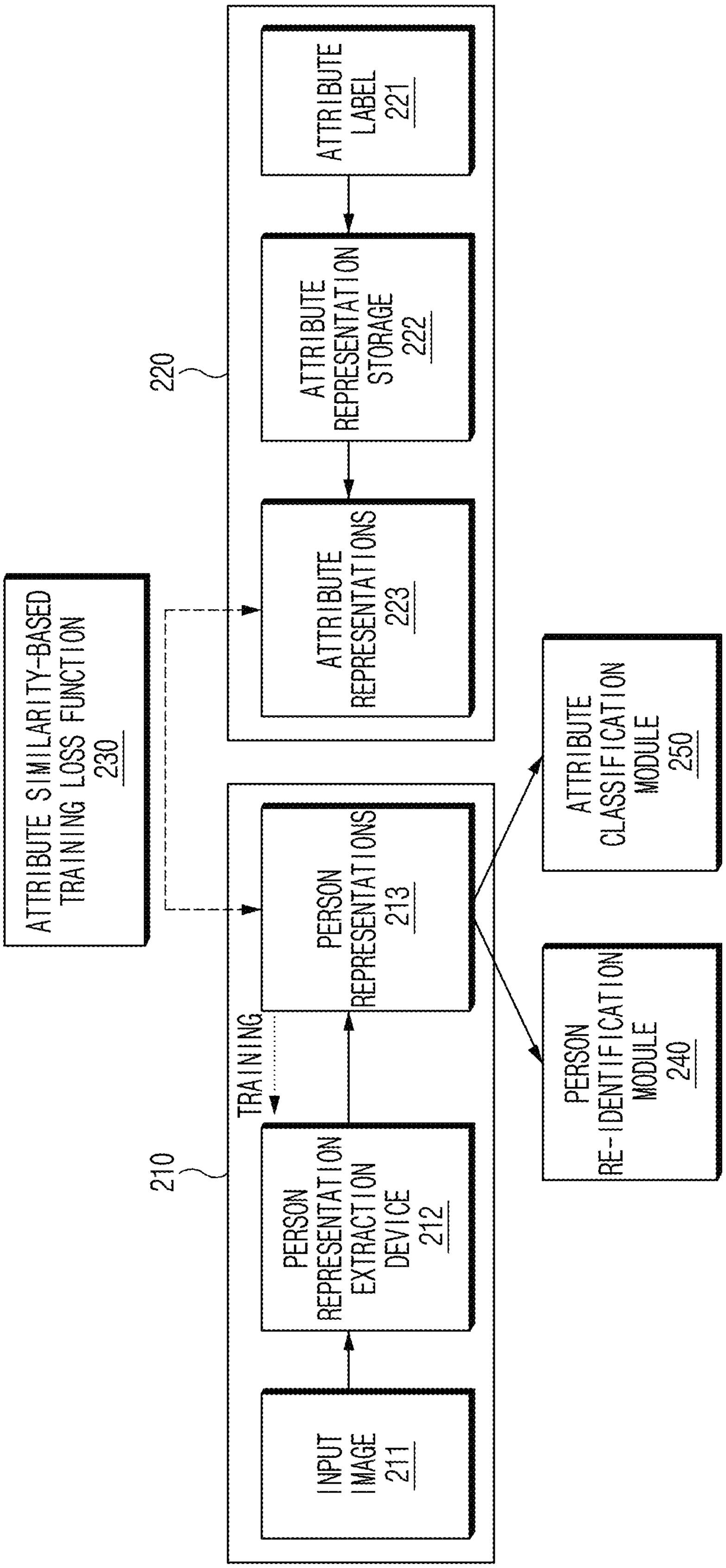
FIG. 2 is a drawing illustrating an integrated framework structure according to embodiments of the present disclosure.

FIG. 2 illustrates an integrated framework structure according to embodiments of the present disclosure.

The integrated framework may be a single model which simultaneously process (or perform) object re-identification, object attribute prediction (or recognition), and attribute-based object search. Such an integrated framework may include a person representation module 210, an attribute representation module 220, a training loss function 230, a person re-identification module 240, and an attribute classification module 250. A processor 150 shown in FIG. 1 may perform person re-identification and person attribute classification using the person representation module 210.

When an input image 211 is provided, the person representation module 210 may input the input image 211 to person representation extraction device 212. The input image 211 may be a person image including a person. The person representation extraction device 212 may extract person representations 213 from the input image 211. The person representations 213 may be an output result of the person representation module 210, which may be a person representation vector value capable of suitably distinguishing a person ID from a person attribute in a training process.

The attribute representation module 220 may input a predefined attribute label 221 to attribute representation storage 222. The attribute representation storage 222 may extract attribute representations 223 based on the attribute label 221. The attribute representations 223 may be an attribute representation vector value extracted from the attribute representation storage 222 based on the predefined attribute label 221.

The attribute representation storage 222 and an attribute similarity-based training loss function 230 may be used to train the person representation module 210. The person representation module 210 may be trained as a fusion module capable of performing person attribute classification and person re-identification together by means of the training loss function 230. By means of such training, the person representation module 210 may perform person re-identification and attribute classification without a separate attribute extraction module in an inference process. As such, because the attribute representation module 220 and the training loss function 230 are used in only the training process and are not used in the inference process, a memory space may be saved and an inference speed may be improved.

Furthermore, according to the present embodiment, as the attribute representations are immediately extracted from the attribute label 221 and the attribute representations are changed in a manner to help train person representations without being used for person re-identification, the occurrence of trade-off may be prevented.

Furthermore, according to the present embodiment, because it is possible to find person representations similar to attribute representations based on the attribute representations, it is possible to search for a person based on a person attribute.

When the input image 211 is provided in the inference process, the person re-identification module 240 may compute (or measure) a similarity between the person representations 213, which are an output of the person representation module 210, to perform person re-identification.

Furthermore, the attribute classification module 250 may compute a similarity between the person representations 213 and the attribute representations 223 to perform person attribute classification.

Figure 3:
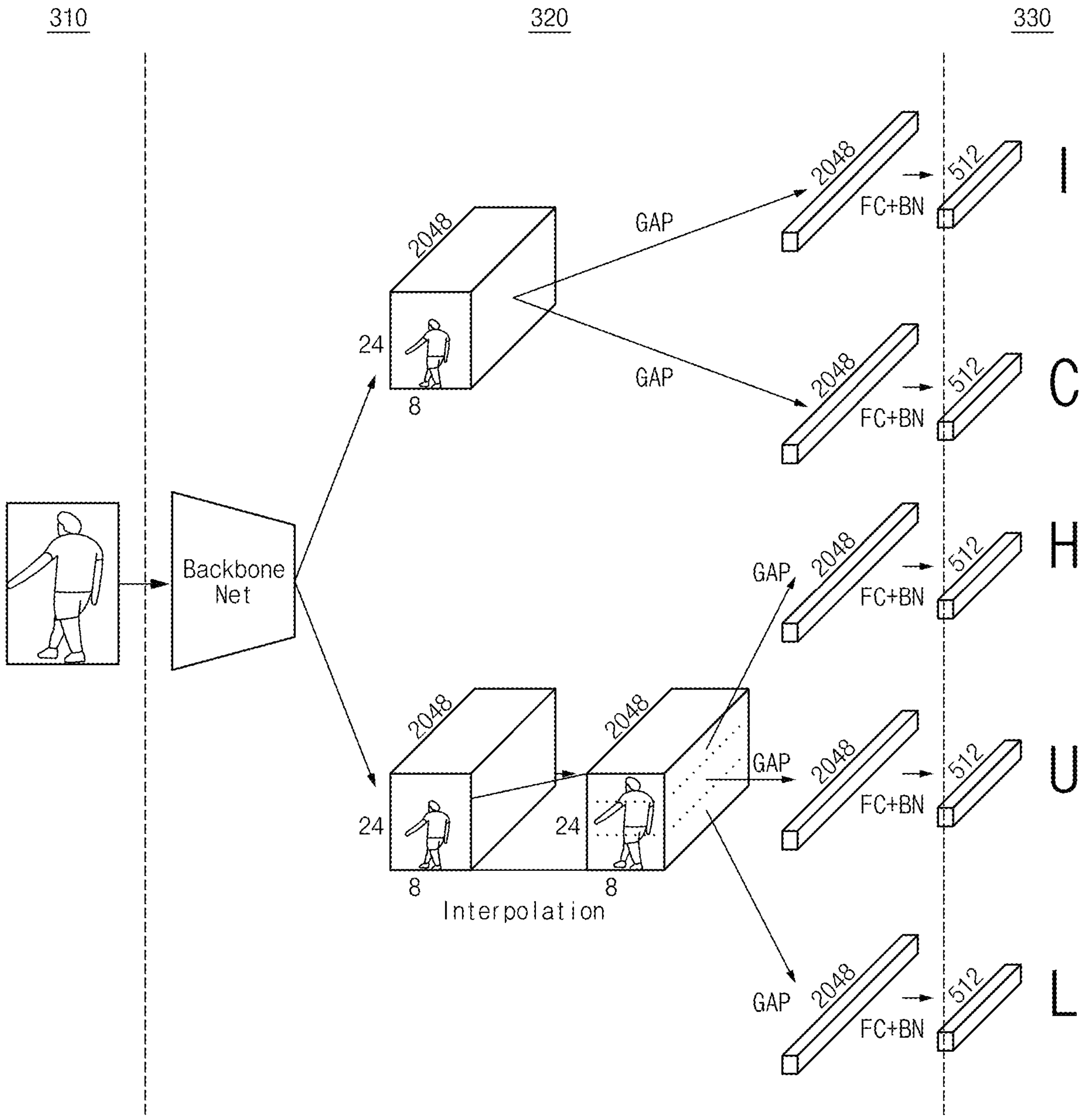
FIG. 3 is a drawing illustrating an operation of a person representation module according to embodiments of the present disclosure.

FIG. 3 illustrates an operation of a person representation module according to embodiments of the present disclosure. In the present embodiment, a description will be given of an operation of a person representation module 210 shown in FIG. 2.

The person representation module 210 may receive a person image as an input image 310.

An output of the person representation module 210, that is, person representations 330 may be divided into five groups. Each group (or partial person representations) may be defined as follows.

- A first group (Identify (I)) may represent a global feature of a person image (e.g., a gender, an age, or the like).
- A second group (Carrying (C)) may represent a feature of holding something in the person image (e.g., a handbag, a backpack, or the like).
- A third group (Head (H)) may represent a head feature in the person image (e.g., a hat, a hair length, or the like).
- A fourth group (Upper (U)) may represent an upper body feature in the person image (e.g., a sleeve length, a color of the top, or the like).
- A fifth group (Lower (L)) may represent a lower body feature in the person image (e.g., a length of bottoms, a color of the bottoms, or the like).

Person representations (i.e., partial person representations) of each group may be a 1×512 vector value. It is possible to change a size of the person representations.

According to the present embodiment, because similar attributes are grouped, a feature for suitably separating an attribute from an ID with respect to a corresponding group may be extracted.

A person representation extraction device 320 may extract multiple partial person representations from the input image 310. At this time, the person representation extraction device 320 may extract a full feature (features of groups I and C)

of the person in the input image 310. Furthermore, the person representation extraction device 320 may segment the input image 310 into regions respectively including a head, an upper body, and a lower body of the person.

The final result output from the person representation module 210, that is, the person representations 330 may be a representation vector for each group. A similarity of the corresponding vector may be compared in an inference process to divide IDs or classify attributes.

Figure 4:
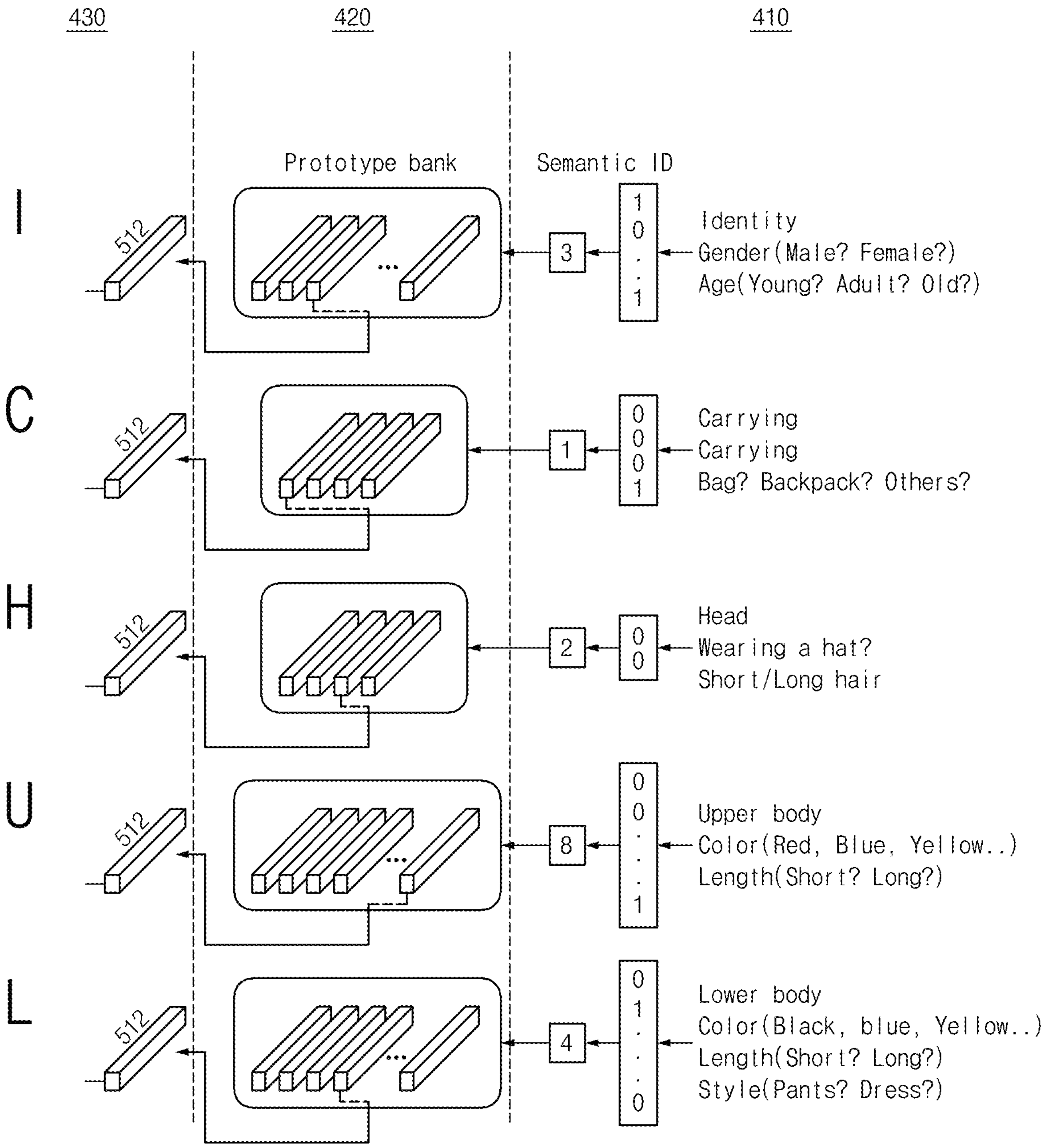
FIG. 4 is a drawing illustrating an attribute representation module according to embodiments of the present disclosure.

FIG. 4 illustrates an attribute representation module according to embodiments of the present disclosure. In the present embodiment, a description will be given of an operation by an attribute representation module 220 shown in FIG. 2.

An attribute label 410 may group and define pieces of attribute information of a predefined person using a similar characteristic. The attribute label 410 may generate a semantic ID by means of a combination of the pieces of grouped attribute information.

Attribute representation storage 420 may return attribute representations 430 corresponding to the generated semantic ID. At this time, the attribute representations 430 may have the same size as person representations 213 or 330.

As the attribute representations 430 are used to measure a similarity with the person representations 213 or 330, they may be trained such that the person representations 213 or 330 are similar to a corresponding attribute prototype.

Figure 5:
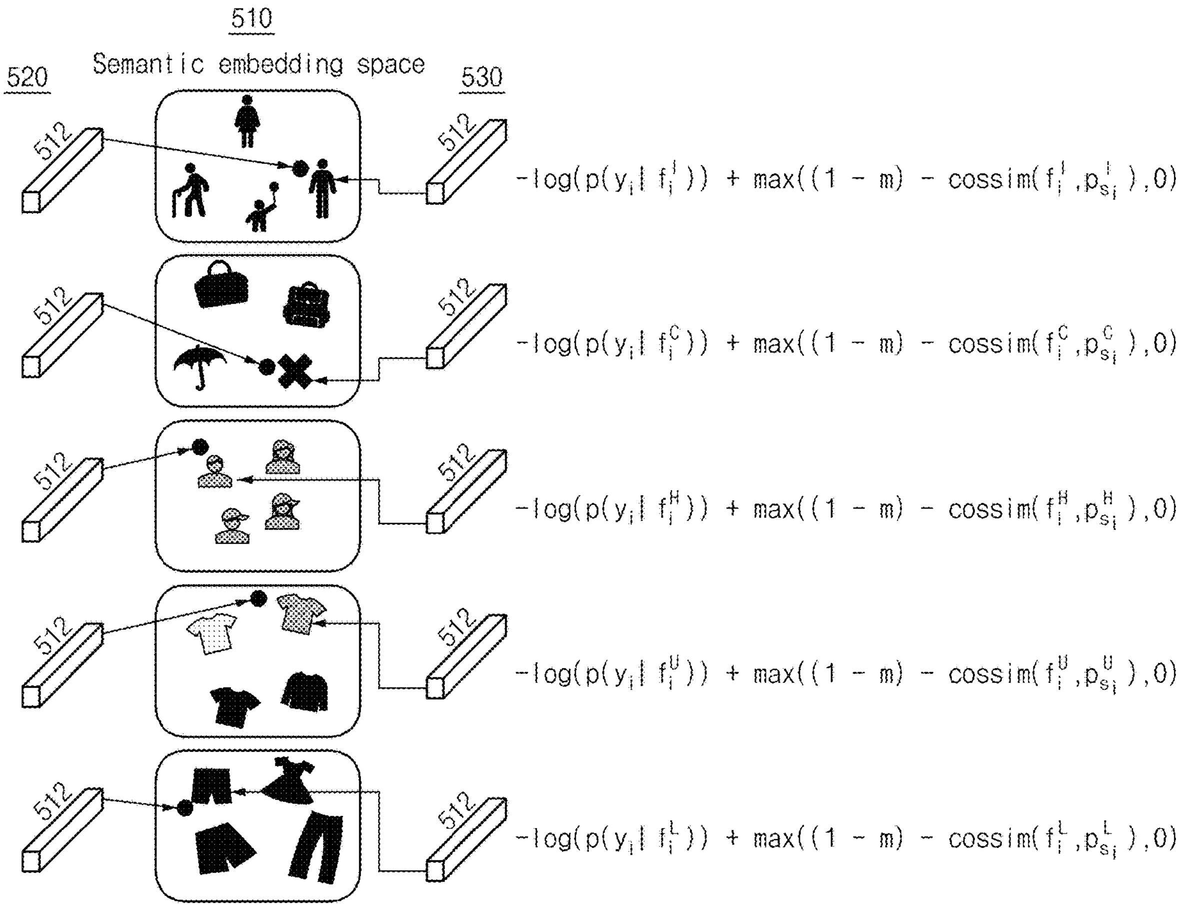
FIG. 5 is a drawing illustrating a process of training a relationship between person representations and attribute representations according to embodiments of the present disclosure.

FIG. 5 is a drawing illustrating a process of training a relationship between person representations and attribute representations according to embodiments of the present disclosure.

A training loss function 510 may correspond to a training loss function 230 shown in FIG. 2. The training loss function 510 may train a relationship between person representations 520 and attribute representations 530 in another embedding space for each attribute group.

The training loss function 510 may train a person representation $f_i$ to suitably predict an ID label $y_i$ of the input image. Furthermore, the training loss function 510 may train the person representation $f_i$ to increase a cosine similarity (cos sim) between the person representation $f_i$ and an attribute representation corresponding to the person representation $f_i$ at the same time.

However, when the cosine similarity between the person representation and the attribute representation is greater than a predefined threshold, the training loss function 510 may allow the cosine similarity not to be increased any longer. This is to prevent a problem of inducing representations of two different persons with the same attribute to be more the same than necessary and causing degradation of re-identification performance, when the similarity between the person representation and the attribute representation is increased to the threshold or more.

Figure 6:
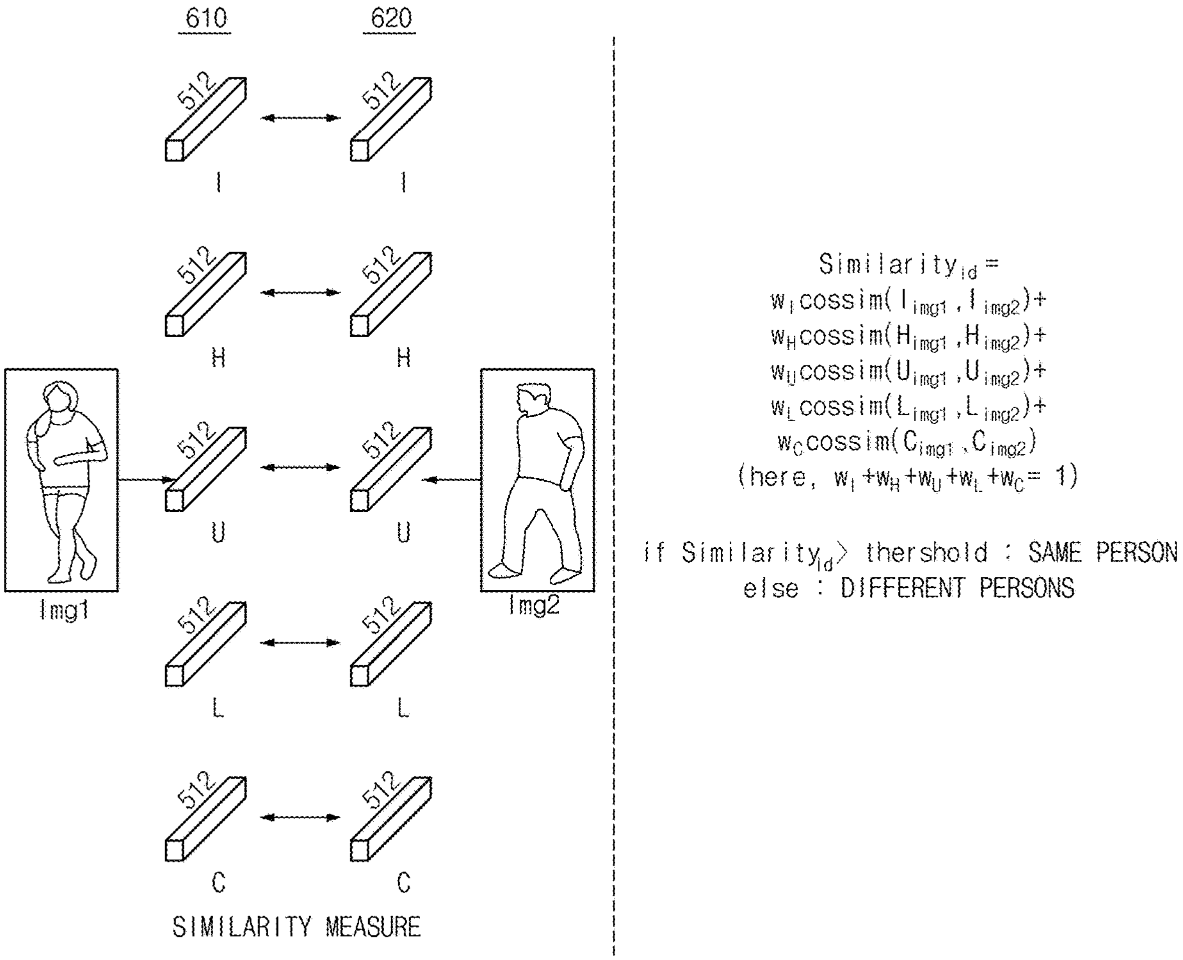
FIG. 6 is a drawing illustrating a process of re-identifying a person according to embodiments of the present disclosure.

FIG. 6 is a drawing illustrating a process of re-identifying a person according to embodiments of the present disclosure. In the present embodiment, a description will be given of a process where a person re-identification module 240 shown in FIG. 2 performs person re-identification using a person representation module 210.

When receiving a first image Img1 and a second image Img2, the person representation module 210 may extract person representations from each image. The person representation module 210 may extract first person representations 610 from the first image Img1 and may extract second person representations 620 from the second image Img2. The person representation module 210 may output the extracted first person representations 610 and the extracted second person representations 620 to a person re-identification module 240.

The person re-identification module 240 may measure similarities between respective groups I, H, U, L, and C of the first person representations 610 and respective groups I, H, U, L, and C of the second person representations 620 and may multiply the similarities of the respective groups by weights $W_I$, $W_H$, $W_U$, $W_L$, and $W_C$ to determine a final similarity. At this time, the person re-identification module 240 may compute a similarity between the first person representations 610 and the second person representations 620 using the cosine similarity. In the present embodiment, it is disclosed to measure the similarity between the person representations using the cosine similarity, but not limited thereto. Another similarity measurement method may be used.

When the final similarity is greater than a predetermined threshold, the person re-identification module 240 may determine that they are the same person. When the final similarity is less than or equal to the threshold, the person re-identification module 240 may determine that they are different persons.

The person re-identification module 240 may make a weight the same to have an average effect, when determining the final similarity between the person representations, and may concentrate a specific group to improve re-identification performance by differently assigning a weight a similarity of each group.

Figure 7:
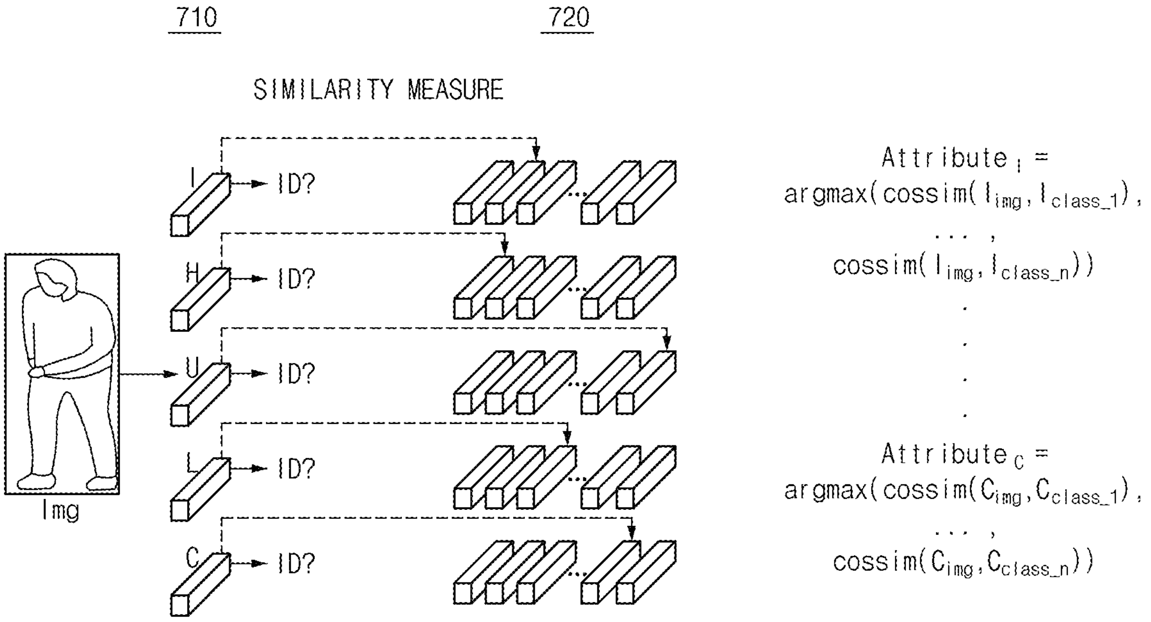
FIG. 7 is a drawing illustrating a process of classifying attributes according to embodiments of the present disclosure.

FIG. 7 is a drawing illustrating a process of classifying attributes according to embodiments of the present disclosure. In the present embodiment, a description will be given of a process where an attribute classification module 250 shown in FIG. 2 performs person re-identification using a person representation module 210.

The attribute classification module 250 may infer an attribute of an input image Img. The attribute classification module 250 may compute a similarity between person representations 710 and attribute representations 720 and may determine an attribute based on the calculated similarity.

The attribute classification module 250 may finally classify an attribute representation with the largest similarity between the person representations 710 and the attribute representations 720 as an attribute.

Figure 8:
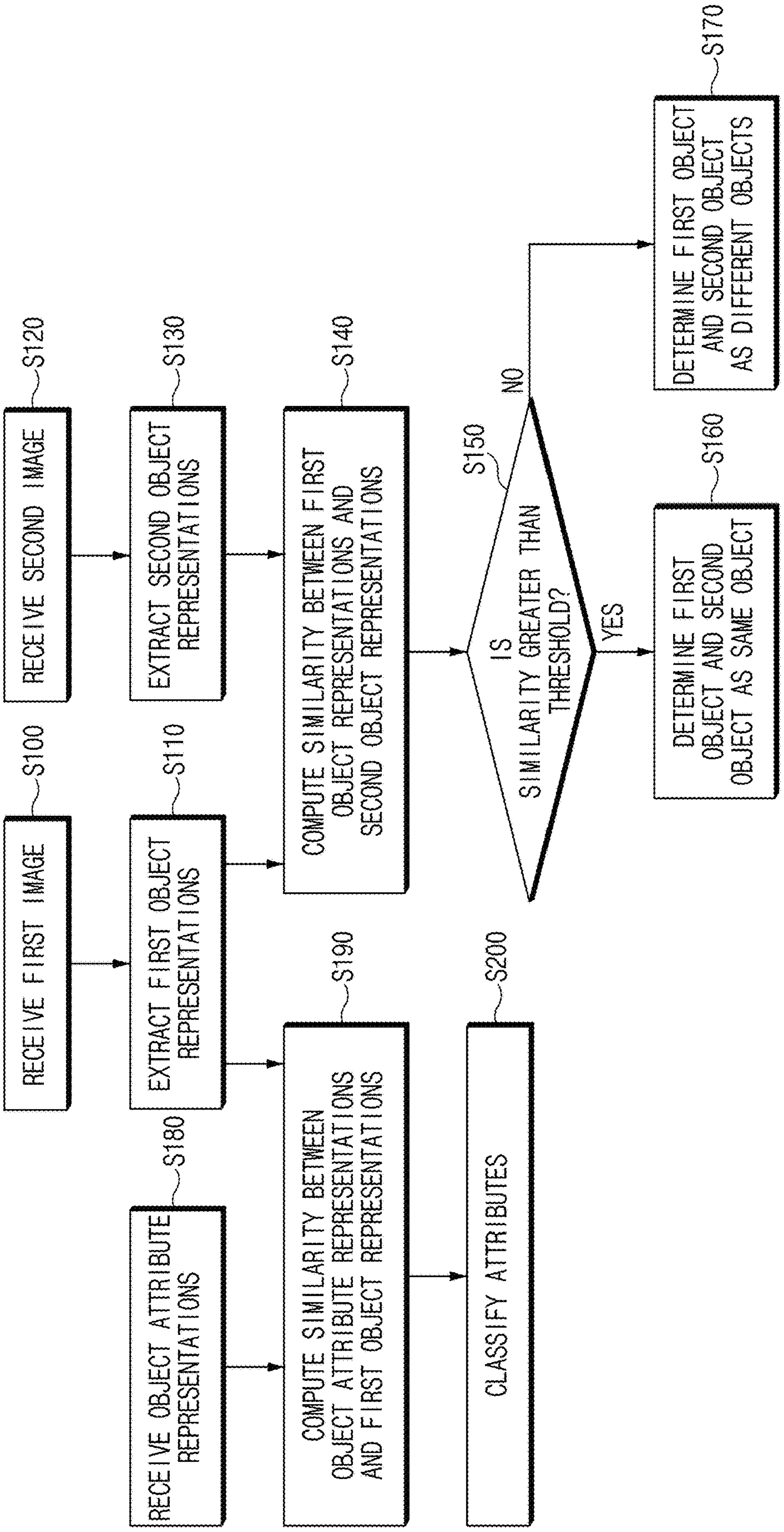
FIG. 8 is a flowchart illustrating a method for re-identifying an object according to embodiments of the present disclosure.

FIG. 8 is a flowchart illustrating a method for re-identifying an object according to embodiments of the present disclosure.

In S100, a processor 150 of FIG. 1 may receive a first image. The first image may be an image including an object such as a person or a vehicle. The first image may be an image obtained by a camera 110 of FIG. 1 or an external electronic device.

In S110, the processor 150 may extract first object representations from the first image. The processor 150 may extract feature information of a first object in the first image. For example, the processor 150 may extract a global feature, a carry-on item feature, a head feature, an upper body feature, and a lower body feature of a first person in the first image.

In S120, the processor 150 may receive a second image. The second image may be an image different from the first image. The second image may be an image obtained by the camera 110 or the external electronic device like the first image.

In S130, the processor 150 may extract second object representations from the second image. The processor 150 may extract feature information of a second object in the second image. For example, the processor 150 may extract a global feature, a carry-on item feature, a head feature, an upper body feature, and a lower body feature of a second person in the second image.

In S140, the processor 150 may compute a similarity between the first object representations and the second object representations. The processor 150 may calculate the similarity between the first object representations and the second object representations using a cosine similarity. The processor 150 may determine a final similarity by applying a weight for each group of object representations.

In S150, the processor 150 may determine whether the computed similarity between the first object representations and the second object representations is greater than a predetermined threshold.

When the computed similarity between the first object representations and the second object representations is greater than the threshold, in S160, the processor 150 may determine the first object and the second object as the same object. In other words, when the similarity between the first object representations and the second object representations is greater than the threshold, the processor 150 may determine that the first object in the first image and the second object in the second image are the same object.

When the computed similarity between the first object representations and the second object representations is less than or equal to the threshold, in S170, the processor 150 may determine the first object and the second object as different objects. In other words, when the similarity between the first object representations and the second object representations is less than or equal to the threshold, the processor 150 may determine that the first object in the first image and the second object in the second image are the different objects.

In S180, the processor 150 may receive object attribute representations. The processor 150 may extract attribute representations based on a predetermined attribute label.

In S190, the processor 150 may compute a similarity between the object attribute representations and the first object representations. The processor 150 may determine the similarity between the object attribute representations and the first object representations using the cosine similarity.

In S200, the processor 150 may classify attributes based on the computed similarity between the object attribute representations and the first object representations. The processor 150 may finally classify an attribute with the largest similarity among similarities between the object attribute representations and the first object representations as attribute representations of the first object.

When applying the above-mentioned object re-identification technology according to embodiments to a CCTV system in a store, the apparatus for re-identifying the object may prepare a manner which analyzes consumer behavior patterns and increase sales based on them. For example, the apparatus for re-identifying the object may quickly analyze a feature of a customer base of a specific product and may efficiently rearrange store products based on the analyzed result.

Furthermore, the apparatus for re-identifying the object may make up a control system capable of quickly identifying the movement of criminals and/or missing persons in the store using the above-mentioned object re-identification technology according to embodiments.

The above-mentioned object re-identification technology according to embodiments may suitably divide an object having a similar attribute. Particularly, when the apparatus for re-identifying the object is applied to a vehicle access system, a security vehicle recognition system, or the like using a vehicle image rather than a person image in a vehicle re-identification field where there are many similar shapes, it may re-identify a vehicle even when a license plate, which is unique information of the vehicle, is not visible.

Embodiments of the present disclosure may save a memory space and may improve an inference speed, because an attribute representation module is used for only training when re-identifying an object and is not used upon inference.

Furthermore, embodiments of the present disclosure may immediately extract attribute representations from an attribute label and may fuse object representations with the attribute representations in the training process in a manner which does not use the attribute representations to re-identify an object and help training object representations, thus improving object re-identification performance.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, embodiments of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. An apparatus comprising:

a processor;

a non-transitory storage medium coupled to the processor, the storage medium storing instructions that, when executed by the processor, cause the processor to:

train an object representation extraction model to learn attribute representations;

input an image obtained by a camera to the trained object representation extraction model;

extract object representations from the image using the trained object representation extraction model; and perform object re-identification based on the object representations, wherein the storage medium stores further instructions that, when executed by the processor, further cause the processor to:

train the object representation extraction model using a loss function so that the object representations are trained to be similar to an attribute prototype corresponding to the object representations, wherein the loss function considers an object ID label of an ith image, ith image object representations, and a probability of accurately predicting the object ID label of the ith image using the ith image object representations, wherein the storage medium stores instructions that, when executed by the processor, further cause the processor to:

limit a similarity between the object representations and the attribute representations within an embedding space such that the similarity is not further increased once the similarity exceeds a predetermined threshold in the loss function, to prevent a degradation in re-identification performance caused by collapse or over-convergence of representation vectors of different objects with identical attributes.

2. The apparatus of claim 1, wherein the storage medium stores instructions that, when executed by the processor, further cause the processor to:

extract a full feature and a partial feature of an object in the image.

3. The apparatus of claim 1, wherein the storage medium stores instructions that, when executed by the processor, further cause the processor to:

extract first object representations from a first image using the trained object representation extraction model; and extract second object representations from a second image using the trained object representation extraction model.

4. The apparatus of claim 3, wherein the storage medium stores instructions that, when executed by the processor, further cause the processor to:

determine a similarity between the first object representations and the second object representations;

determine that a first object in the first image and a second object in the second image are the same object, when the determined similarity is greater than a predetermined threshold; and determine that the first object and the second object are different objects, when the determined similarity is less than or equal to the predetermined threshold.

5. The apparatus of claim 4, wherein the storage medium stores instructions that, when executed by the processor, further cause the processor to:

finally determine a similarity between the first object representations and the second object representations by applying a weight.

6. The apparatus of claim 1, wherein the storage medium stores instructions that, when executed by the processor, further cause the processor to:

classify and group pieces of attribute information of a predefined object depending on a predetermined classification condition;

generate a semantic identity (ID) using a combination of the pieces of attribute information in the group; and return attribute representations corresponding to the semantic ID.

7. The apparatus of claim 6, wherein the storage medium stores instructions that, when executed by the processor, further cause the processor to:

calculate a similarity between the returned attribute representations and the object representations; and classify an object attribute based on the similarity between the returned attribute representations and the object representations.

8. The apparatus of claim 1, wherein the object representations are a same size as the attribute representations.

9. A method comprising:

training, by a processor, an object representation extraction model to train attribute representations;

inputting, by the processor, an image obtained by a camera to the trained object representation extraction model;

extracting, by the processor, object representations from the image using the trained object representation extraction model; and performing, by the processor, object re-identification based on the object representations, training, by the processor, the object representation extraction model using a loss function so that the object representations are trained to be similar to an attribute prototype corresponding to the object representations, wherein the loss function considers an object ID label of an ith image, ith image object representations, and a probability of accurately predicting the object ID label of the ith image using the ith image object representations;

determining that a similarity between the object representations and the attribute representations within an embedding space exceeds a predetermined threshold in the loss function; and limiting, by the processor, the similarity between the object representations and the attribute representations within the embedding space, such that the similarity is not further increased, in response to determining that the similarity exceeds the predetermined threshold in the loss function, to prevent a degradation in re-identification performance caused by collapse or over-convergence of representation vectors of different objects with identical attributes.

10. The method of claim 9, wherein extracting of the object representations includes:

extracting, by the processor, a full feature and a partial feature of an object in the image.

11. The method of claim 9, wherein extracting of the object representations includes:

extracting, by the processor, first object representations from a first image using the trained object representation extraction model; and extracting, by the processor, second object representations from a second image using the trained object representation extraction model.

12. The method of claim 11, wherein extracting of the object representations includes:

determining, by the processor, a similarity between the first object representations and the second object representations;

determining, by the processor, that a first object in the first image and a second object in the second image are the same object, when the determined similarity is greater than a predetermined threshold; and determining, by the processor, that the first object and the second object are different objects, when the determined similarity is less than or equal to the predetermined threshold.

13. The method of claim 12, wherein determining of the similarity between the first object representation and the second object representation includes:

finally determining, by the processor, a similarity between the first object representations and the second object representations by applying a weight.

14. The method of claim 9, wherein training of the object representation extraction model includes:

classifying and grouping, by the processor, pieces of attribute information of a predefined object depending on a predetermined classification condition;

generating, by the processor, a semantic ID using a combination of the pieces of attribute information in the grouped group; and returning, by the processor, attribute representations corresponding to the semantic ID.

15. The method of claim 14, further comprising:

calculating, by the processor, a similarity between the returned attribute representations and the object representations; and classifying, by the processor, an object attribute based on the similarity between the returned attribute representations and the object representations.

16. The method of claim 9, wherein the object representations are a same size as the attribute representations.

* * * * *